United States Patent [19]

Furuichi et al.

[11] Patent Number: 5,581,429

[45] Date of Patent: Dec. 3, 1996

[54] THIN-FILM MAGNETIC HEAD HAVING IMPROVED MAGNETIC POLE STRUCTURE

[75] Inventors: Shinji Furuichi; Kuniaki Yoshimura, both of Mooka, Japan

[73] Assignee: Hitachi Metals, Ltd., Japan

[21] Appl. No.: 418,110

[22] Filed: Apr. 6, 1995

[30] Foreign Application Priority Data

Apr. 7, 1994 [JP] Japan .................................. 6-093727

[51] Int. Cl.⁶ ..................................................... G11B 5/147
[52] U.S. Cl. ............................................................. 360/126
[58] Field of Search ...................................... 360/126, 113

[56] References Cited

U.S. PATENT DOCUMENTS 5,253,134  10/1993  Kato et al. ............................... 360/126
5,264,981  11/1993  Campbell et al. ....................... 360/126
5,270,893  12/1993  Sasaki et al. ............................ 360/113

FOREIGN PATENT DOCUMENTS 53-29090   8/1978   Japan .

Primary Examiner—John H. Wolff
Attorney, Agent, or Firm—Staas & Halsey

[57] ABSTRACT

The thin-film magnetic head comprises a gap layer, coil layer, insulating layer, and top magnetic pole layer stacked in sequence on the bottom magnetic pole layer, and a magnetic gap formed at the end position of the gap layer. The top magnetic pole layer is magnetically joined to the bottom magnetic pole layer over the whole width at the opposite position of the magnetic gap. All these enable an easy production of the thin-film magnetic head keeping the magnetic resistance of the magnetic circuit small and having a structure appropriate to a higher recording density.

6 Claims, 2 Drawing Sheets

THIN-FILM MAGNETIC HEAD HAVING IMPROVED MAGNETIC POLE STRUCTURE

BACKGROUND OF THE INVENTION

1. Field of the Invention

The present invention refers to a thin-film magnetic head for the magnetic recording device arranged to make up a magnetic core, magnetic gap, coil, and the like by the thin-film formation method and, more particularly, a thin-film magnetic head that can cope with a high recording density by making the magnetic resistance of a magnetic core small.

2. Description of the Related Art

In the magnetic playback device, a slider with a built-in magnetic head as one unit is fixed to the gimbal at the tip of a load arm and the flow of air past the slider as the magnetic disk rotates causes the slider to float above the magnetic disc at a position so that the magnetic head can read/write information from/to the magnetic disk through a magnetic gap at a position of the magnetic head opposed to the magnetic disk.

The floating magnetic head is formed with an electromagnetic converter element integrated in the slider. As an electromagnetic converter element, a type of element with a coil wound on the core, and a thin-film magnetic head with the magnetic core, magnetic gap, coil, and the like fabricated by the thin-film formation method are known.

As shown in FIG. 4, the thin-film magnetic head comprises a bottom magnetic pole layer 12 formed of permalloy, a gap layer 13, a spiral copper coil layer 14, an insulating layer 15, a permalloy top magnetic pole layer 16 in sequence stacked on a ceramic wafer 11, and is so constructed as to have a magnetic gap 17 at the end of the gap layer 13 facing the magnetic recording medium. To form a magnetic circuit of the bottom magnetic pole layer 12, the top magnetic pole layer 16, and the magnetic gap 17, the opposite portion of the top magnetic pole layer 16 to the magnetic gap 17 is magnetically joined to the bottom magnetic pole layer 12. For this joining, as shown in FIG. 5, a hole 18 is bored through a portion of the gap layer 13 and the insulating layer 15 that corresponds to the above joining on the bottom magnetic pole layer 12 and is filled with the formation of the top magnetic pole layer 16 after making the hole 18 so that the top magnetic pole layer 16 is magnetically joined to the bottom magnetic pole layer 12 through the portion of the hole 18.

FIG. 6 is a sectional view taken along the line A—A of FIG. 4. In connection with the width W of the top magnetic pole layer 16, the portion corresponding to the hole is formed with the bottom side width $W_2$ smaller than the top side width $W_1$, what is called in a shape of inverse trapezoid, and the magnetic pole layer is stacked on the side face of the hole 18 at the making of the top magnetic pole layer 16 to connect the top magnetic pole layer 16 to the bottom magnetic pole layer 12. On the other hand, the top magnetic pole layer 16 is extended to the position corresponding to the magnetic gap 17 to form a magnetic gap and to constitute a magnetic circuit together with the top magnetic pole layer 16 and the bottom magnetic pole layer 12.

Recently, with increasing density of the magnetic recording, a magnetic head becomes small-sized and correspondingly magnetic pole layers forming the magnetic circuit naturally become smaller. Thus, there is a problem that lowering of the joining area leads to an increase in magnetic resistance though a hole is bored in the gap layer 13 or the insulating layer 15 and the top and bottom magnetic pole layers are magnetically connected at the size of the hole portion.

In addition, the hole 18 for connecting the top magnetic pole layer 16 to the bottom magnetic pole layer 12 is formed in a shape of inverse trapezoid, the magnetic pole layer is difficult to be stacked on the side face of the hole 18, in the worst case does not connect the top and bottom magnetic pole layers, that is, the disconnection between both the magnetic pole layers happens and so the magnetic resistance increases more and more. The smaller the bottom side width $W_2$ is than the top side width $W_1$, the easier the magnetic pole layer becomes in being deposited on the side face of the hole 18. However, since it is so constructed that the top side width $W_1$ is smaller than the width W of the top magnetic pole layer 16, the narrowed W accompanying the small-sized magnetic head makes the bottom side width $W_2$ smaller increasingly, thereby resulting in an increase in magnetic resistance.

Furthermore, if there is a magnetic material near the coil, a leakage flux increases and consequently a related increase in inductance occurs. And, the stray capacity becomes also larger, thereby worsening the high frequency characteristics. That is, all these are inappropriate to the high recording density. The sectional area of a magnetic circuit can be decreased in inverse proportion to the frequency. The prior art top magnetic pole layer is thicker than is required, covers the coil layer and so had a structure inappropriate for a high frequency application.

SUMMARY OF THE INVENTION

To solve the above problems, it is one object of the present invention to provide a thin-film magnetic head that exhibits a small magnetic resistance in the magnetic circuit and is easy to manufacture.

In the thin-film magnetic head for a magnetic recording apparatus wherein a gap layer, coil layer, insulating layer, top magnetic pole layer and protective layer are stacked on the bottom magnetic pole layer, a magnetic gap is formed at the end position of the gap layer, facing the magnetic recording medium, and a magnetic circuit is formed of the bottom and top magnetic pole layers, the present invention is featured by the top magnetic pole layer consisting of a base joined to the bottom magnetic pole layer, a magnetic pole main portion extending from the almost whole region of said base to the side of a magnetic gap over the insulating layer, and a narrow gap magnetic pole in the position corresponding to the magnetic gap.

In the above thin-film magnetic head, the magnetic pole main portion extends almost linearly from the joining portion with the bottom magnetic pole layer toward the magnetic gap side. The width of the magnetic pole main portion is so constructed as to be equal to or less than the base comprising said joining portion. The base of the top magnetic pole layer is magnetically connected to the bottom magnetic pole layer over the whole width.

Furthermore, in the above thin-film magnetic head, the magnetic pole main portion of the top magnetic pole layer may nearly form a rectangle wider than the gap portion, the base being wider than the magnetic pole main portion. In addition, the top magnetic pole layer may nearly form an inverse lachrymal drop.

In the above thin-film magnetic head, because the whole width portion opposed to the magnetic gap of the top magnetic pole layer is connected to the bottom magnetic pole layer, a magnetic resistance in the connection portion between the top and bottom magnetic pole layers can be made small and deposition of the magnetic pole layer onto the joining portion is facilitated. The top magnetic pole layer is connected to the bottom magnetic pole layer at much the same width as with the portion covering the insulating layer or in a wider range and consequently a magnetic resistance can be kept small even if the magnetic head is formed in a small size. Furthermore, because the size of the top magnetic pole layer is determined to the necessary minimum, inductance can be made small and the stray capacity can be minimized, so that a thin-film magnetic head can be obtained which corresponds to a high frequency application, or is appropriate to a higher recording density.

DESCRIPTION OF THE PREFERRED EMBODIMENT

Figure 1:
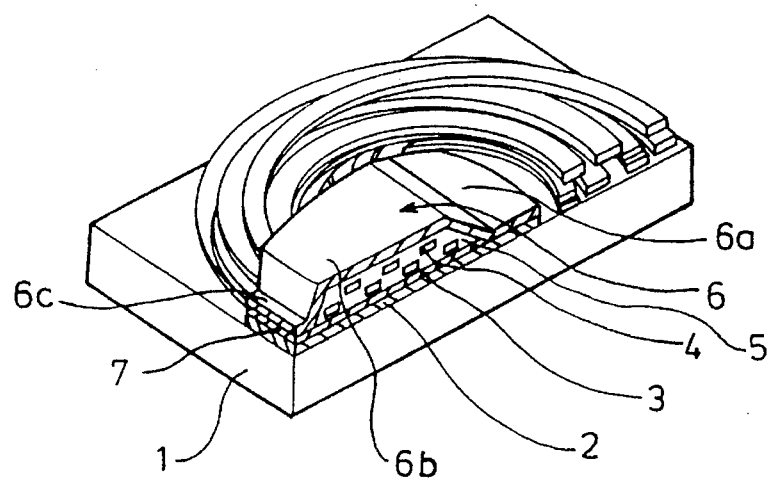
FIG. 1 is a perspective partly sectional view of a thin-film magnetic head according to the present invention.
Figure 2:
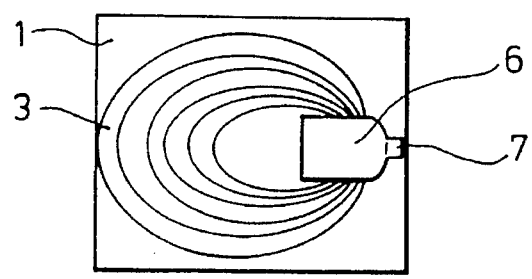
FIG. 2 is a plan view of the thin-film magnetic head.
Figure 3A:
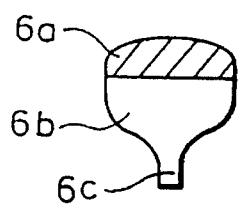
FIG. 3 is a plan view of the joining portion between the bottom and top magnetic pole layers of the thin-film magnetic head.
Figure 3B:
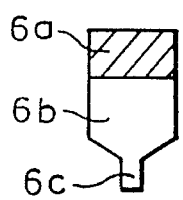

One embodiment according to the present invention is described referring to FIGS. 1 to 3.

A magnetic head according to the present invention comprises a bottom magnetic pole layer 2 made of permalloy, a gap layer 3 made of alumina, silicon oxide, or the like, a spiral coil layer 4 made of copper, an insulating layer 5 made of resist and the like, the top magnetic pole layer 6 made of permalloy, and a protective layer, not shown, stacked on a ceramic wafer 1 by a thin-film formation method, such as sputtering and plating, and further a magnetic gap 7 formed at the end of the gap layer 3 facing a magnetic recording medium. The top magnetic pole layer 6 comprises a base 6a magnetically joined to the bottom magnetic pole layer 2 at the whole width of the end situated in the center of the coil layer 4 opposite the magnetic gap 7, a magnetic pole main portion 6b linearly extending from the base 6a to the side of a magnetic gap 7 over the insulating layer 5, and a narrow gap magnetic pole 6c in the position corresponding to the magnetic gap 7. And, a magnetic circuit having the magnetic gap 7 is formed out of the top magnetic pole layer 6 and the bottom magnetic pole layer 2.

Usually, the bottom magnetic pole layer 2, about 3 μm thick, the gap layer 3, about 0.5 μm thick, the coil layer 4, about 3 μm thick, the insulating layer 5, about 9 μm thick between the top magnetic pole layer and the bottom magnetic pole layer, and the top magnetic pole layer 6, about 3 μm thick, are formed into films.

The section of the top magnetic pole layer 6 is formed nearly in a C-shape, the base 6a, at which the top magnetic pole layer 6 is magnetically joined to the bottom magnetic pole layer 2, is joined to the bottom magnetic pole layer 2 over the whole width so that a magnetic resistance may become small. However, the base 6a may be formed in such a shape as to be joined to the almost overall coilless portion at the center of the coil layer 4. As shown in FIG. 3(a) and (b), the magnetic-pole main portion 6b is formed nearly in a rectangle of large width, the width of a portion in which the magnetic-pole main portion 6b is continued to the base 6a is nearly the same as the base 6a. The portion in which the magnetic pole main portion 6b is continued to the gap magnetic pole 6c is formed in such a shape as to become gradually narrow, and is followed by the gap magnetic pole 6c.

Figure 3C:
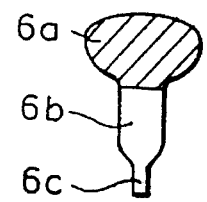
Figure 4:
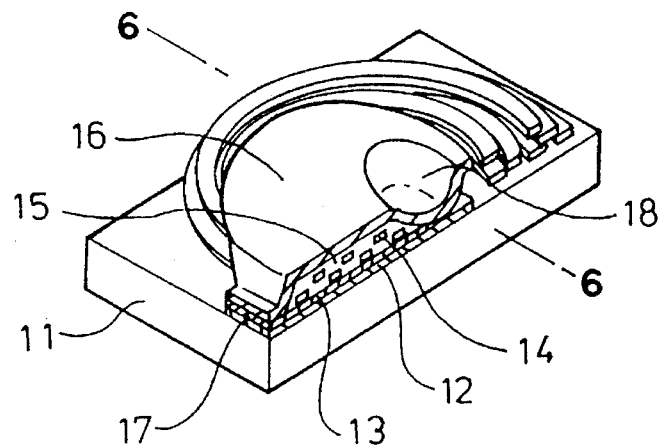
FIG. 4 is a perspective and partly sectional view of a prior art magnetic head.
Figure 5A:
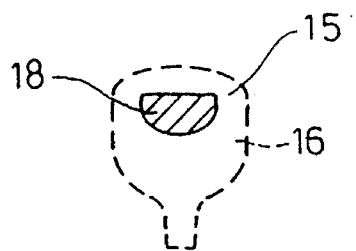
FIG. 5 is a plan view of the joining portion between the bottom and top magnetic pole layers of a prior art thin-film magnetic head.
Figure 5B:
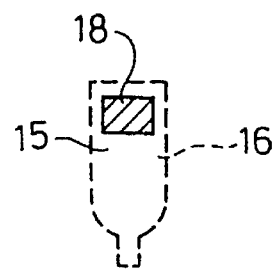
Figure 6:
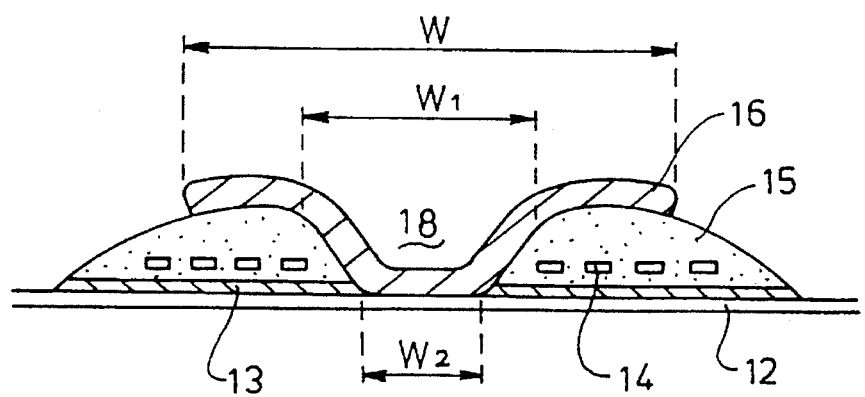
FIG. 6 is a sectional view taken along the line A—A of FIG. 4 and a plan view of the top magnetic pole layer.

Incidentally, the top magnetic pole layer 6 is formed nearly in a shape of inverse lachrymal drop, as shown in FIG. 3. Also, as shown in FIG. 3(c), the base 6a forming the joining portion between the top magnetic pole layer 6 and the bottom magnetic pole layer 2 may be formed with the magnetic pole main portion 6b over the insulating layer 5 made narrower than the area of the base 6a so that inductance and stray capacity may be smaller.

A thin-film magnetic head constructed as described above, can read or write information between the magnetic gap and a magnetic recording medium by being integrated in a slider and opposing the magnetic gap 7 to a rotating magnetic recording medium at an infinitesimal space.

In the thin-film magnetic head according to the above invention, because the top magnetic pole layer is joined to the bottom magnetic pole layer at much the same width as with the portion over the insulating layer, a magnetic resistance of the magnetic circuit can be made small even for a small-sized magnetic head in comparison with a conventional thin-film magnetic head having the narrower joining portion to the bottom magnetic pole layer than the width of the top magnetic pole layer, and further the connecting portion of the top magnetic pole layer can be easily stacked in a state of smaller magnetic resistance.

By forming the connecting portion (base) of the top magnetic pole layer to the bottom magnetic pole layer wider than the covering portion thereof over the insulating layer, the magnetic resistance of a magnetic circuit can be kept small.

What is more, because the size of the top magnetic pole layer above the coil layer can be made much smaller than that of the conventional one, the leakage flux can be greatly reduced. Thus, an inductance minimum magnetic head can be obtained and at the same time the stray capacity can be made small, thereby enabling a high recording density coping thin-film head to be implemented.

What is claimed is:

1. A thin-film magnetic head comprising:

an elongated bottom magnetic pole layer having first and second longitudinally spaced apart terminal end portions and a central portion located between said end portions, said second terminal end portion having a transverse width;

an elongated gap layer stacked on said bottom magnetic pole layer and having a first terminal end segment on said first terminal end portion of the bottom magnetic pole layer and a second segment on said central portion of the bottom magnetic pole layer;

a coil and insulating structure stacked on the second segment of the gap layer; and an elongated top magnetic pole layer stacked on said bottom magnetic pole layer, said gap layer and said structure, said top magnetic pole layer having first and second longitudinally spaced apart terminal end sections and a central section located between said terminal end sections, the first terminal end section of the top magnetic pole layer being magnetically joined to said second terminal end portion of the bottom magnetic pole layer across the entire width of the latter, and the second terminal end section of the top magnetic pole layer being on said first terminal end segment of the gap layer, whereby a magnetic gap is presented between the first terminal end portion of the bottom magnetic pole layer and the second terminal end section of the top magnetic pole layer.

2. A thin-film magnetic head as set forth in claim 1, wherein said central section of the top magnetic pole layer is elongated and extends longitudinally between said first terminal end section and said second terminal end section thereof.

3. A thin-film magnetic head as set forth in claim 2, wherein said second terminal end section of the top magnetic pole layer has a transverse width which is essentially the same as the transverse width of the second terminal end portion of the bottom magnetic pole layer, and said central section of the top magnetic pole layer has a transverse width which is equal to or less than the transverse width of the second terminal end section thereof.

4. A thin-film magnetic head as set forth in claim 2, wherein said first terminal end section of the top magnetic pole layer has a transverse width which is essentially the same as the transverse width of the second terminal end portion of the bottom magnetic pole layer, said central section of the top magnetic pole layer has a transverse width which is less than the transverse width of the first terminal end section of the top magnetic pole layer, and said second terminal end section of the top magnetic pole layer has a transverse width which is less than the transverse width of the central section of the top magnetic pole layer.

5. A thin-film magnetic head as set forth in claim 2, wherein said central section of the top magnetic pole layer is generally rectangularly shaped.

6. A thin-film magnetic head as set forth in claim 2, wherein said top magnetic pole layer is generally shaped in the form of a tear drop.

\* \* \* \* \*